(12) United States Patent
Suzuki et al.

(10) Patent No.: US 11,926,210 B1
(45) Date of Patent: Mar. 12, 2024

(54) CONTROLLER FOR VEHICLE

(71) Applicant: HONDA MOTOR CO., LTD., Tokyo (JP)

(72) Inventors: Noriaki Suzuki, Tokyo (JP); Kazuya Sakurai, Tokyo (JP); Tetsuya Suko, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/344,879

(22) Filed: Jun. 30, 2023

(30) Foreign Application Priority Data

Aug. 26, 2022 (CN) .......................... 202211032171.3

(51) Int. Cl.
| | |
|---|---|
| *B60W 10/10* | (2012.01) |
| *B60K 1/04* | (2019.01) |
| *B60K 20/06* | (2006.01) |
| *B60W 30/182* | (2020.01) |
| *B60W 50/08* | (2020.01) |
| *B62D 1/04* | (2006.01) |
| *F16H 59/02* | (2006.01) |
| *F16H 61/02* | (2006.01) |
| *B60W 40/06* | (2012.01) |

(52) U.S. Cl.
CPC ............ *B60K 20/06* (2013.01); *B60W 10/10* (2013.01); *B62D 1/046* (2013.01); *F16H 59/02* (2013.01); *F16H 61/02* (2013.01); *F16H 61/0213* (2013.01); *F16H 61/0248* (2013.01); *B60W 30/182* (2013.01); *B60W 40/06* (2013.01); *B60W 50/082* (2013.01); *F16H 2059/0221* (2013.01); *F16H 2059/0247* (2013.01)

(58) Field of Classification Search
CPC .. F16H 61/0213; F16H 61/0248; F16H 61/02; F16H 59/02; F16H 2059/0221; F16H 2059/0239; F16H 2059/0247; B60K 20/06; B60K 1/046; B60W 10/10; B60W 30/182; B60W 40/06; B60W 50/082; B60W 2050/0083; B60W 2540/12
See application file for complete search history.

(56) References Cited

U.S. PATENT DOCUMENTS

| | | | | |
|---|---|---|---|---|
| 10,315,506 B2* | 6/2019 | Herrmann | ............. | B60W 10/08 |
| 2008/0294317 A1* | 11/2008 | Cho | ........................ | F16H 59/02 |
| | | | | 701/51 |

(Continued)

FOREIGN PATENT DOCUMENTS

JP 2001116139 A 4/2001

*Primary Examiner* — Tinh Dang
(74) *Attorney, Agent, or Firm* — CKC & Partners Co. LLC

(57) ABSTRACT

A paddle shifter includes a pair of operation portions that decrease or increase the deceleration, the shift characteristic of the vehicle is set to a fixed shift mode based on the operation of the driver in response to an operation of one operation portion, a shift characteristic of the vehicle is set to a fixed shift mode based on the operation of the driver in response to an operation of the one operation portion, the shift characteristic of the vehicle is set to an automatic shift mode based on a running condition of the vehicle in response to an operation of the other operation portion, and when the one operation portion of the pair of operation portions remains in an ON state for a predetermined period of time, a change in the shift characteristic of the vehicle based on the other operation portion is activated.

4 Claims, 3 Drawing Sheets

(56) References Cited

U.S. PATENT DOCUMENTS

| | | | |
|---|---|---|---|
| 2012/0150396 A1* | 6/2012 | Ajimoto | F16H 61/0213 |
| | | | 701/52 |
| 2014/0005867 A1* | 1/2014 | Wang | F16H 61/66 |
| | | | 477/3 |
| 2015/0183437 A1* | 7/2015 | Minamisawa | B60W 10/107 |
| | | | 701/54 |
| 2017/0282935 A1* | 10/2017 | Fujimoto | B60W 50/08 |

* cited by examiner

CONTROLLER FOR VEHICLE

CROSS REFERENCE TO RELATED APPLICATIONS

This application claims the benefit of priority to Chinese Patent Application No. CN202211032171.3 filed on Aug. 26, 2022. The entire contents of this application are hereby incorporated herein by reference.

BACKGROUND OF THE INVENTION

Field of the Invention

The present invention relates to a controller for vehicle. In particular, the present invention relates to behavior of a deceleration selector during a paddle operation.

Related Art

As disclosed in Japanese Unexamined Patent Application, Publication No. 2001-116139, a selector is known that includes a paddle shift that enables manual shifting and a changeover switch that changes over activation and deactivation of the paddle shift, and that enables manual shifting using a shift lever when the paddle shift is fixed in an ON state due to malfunction.
Patent Document 1: Japanese Unexamined Patent Application, Publication No. 2001-116139

SUMMARY OF THE INVENTION

However, the technique according to the conventional art has a problem that when one paddle assigned with a fixed shift mode setting function of a pair of paddles constituting a paddle shift is fixed in an ON state due to malfunction and the other paddle assigned with an automatic shift mode setting function is operated, an ON operation with both of the paddles is deactivated and a shift characteristic of a vehicle cannot be changed. Therefore, it is an object of the present invention to provide a controller for vehicle that enables, even when one operation portion is fixed in a certain state due to malfunction, control based on the other operation portion to be activated, and is capable of completing the change of the shift characteristic of the vehicle based on the other operation portion by a paddle shift. The present invention aims at improving safety of the vehicle in order to solve the above problem. In addition, the present invention is to further improve traffic safety and contribute to the development of a sustainable transportation system.

The present invention provides a controller for vehicle, comprising a paddle shifter provided in a steering apparatus of a vehicle, the paddle shifter being capable of changing deceleration of the vehicle and a shift characteristic of the vehicle, the paddle shifter including a pair of operation portions that decrease or increase the deceleration relative to current deceleration in response to an operation of a driver, in which, the shift characteristic of the vehicle is set to a fixed shift mode based on the operation of the driver in response to an operation of one operation portion, the shift characteristic of the vehicle is set to an automatic shift mode based on a running condition of the vehicle in response to an operation of the other operation portion, and when the one operation portion of the pair of operation portions remains in an ON state for a predetermined period of time, a change in the shift characteristic of the vehicle based on the other operation portion is activated.

According to such a controller for vehicle, when the one operation portion remains in the ON state for a predetermined period of time, the control based on the other operation portion can be activated, and the change in the shift characteristic of the vehicle based on the other operation portion can be completed with the paddle shift, that is, the operation portion. Further, activation and deactivation of the control can be switched based on the duration of the ON state of the one operation portion, and thus a component or a circuit does not need to be provided separately to determine malfunction, which can further contribute to cost reduction.

In the controller for vehicle of the present invention, when the one operation portion remains in the ON state for the predetermined period of time and then the other operation portion enters an ON state, the paddle shifter switches the shift characteristic of the vehicle to the automatic shift mode.

According to such a controller for vehicle, when the one operation portion (DOWN paddle) remains in the ON state for a predetermined period of time and then the other operation portion (UP paddle) enters the ON state, the paddle shifter can set the shift characteristic of the vehicle to the automatic shift mode.

In the controller for vehicle of the present invention, the controller further includes a notifier that notifies the driver, the notifier performs notification in a first form when the shift characteristic of the vehicle becomes the automatic shift mode based on the running condition of the vehicle, and the notifier performs notification in a second form different from the first form when the shift characteristic of the vehicle becomes the fixed shift mode based on the operation of the driver.

According to such a controller for vehicle, since the driver recognizes, based on the notification result of the notifier, whether the shift characteristic of the vehicle is in the automatic shift mode or the fixed shift mode, it is possible to cause the driver to more reliably recognize ON fixation occurring in the paddle shift, and to quickly execute subsequent behavior (switching to a smart paddle).

According to the present invention, it is possible to provide a controller for vehicle that enables, even when one operation portion is fixed in a certain state due to malfunction, control based on the other operation portion to be activated, and is capable of completing the change of shift characteristic of the vehicle based on the other operation portion by a paddle shift.

DETAILED DESCRIPTION OF THE INVENTION

A controller for vehicle of the present embodiment relates to a paddle shifter arranged near a steering wheel of the vehicle. The paddle shifter includes a switch in the shape of a paddle provided around the steering wheel. A driver of the vehicle can perform various operations including a shift operation without taking his/her hands off from the steering wheel by operating the switch. In the controller for vehicle of the present embodiment, even when the paddle shifter is fixed in a certain state due to malfunction, it is possible to cope with such a situation with a simple configuration. An embodiment of the present invention will be described below with reference to the drawings.

<Configuration of Controller for Vehicle>

Figure 1:
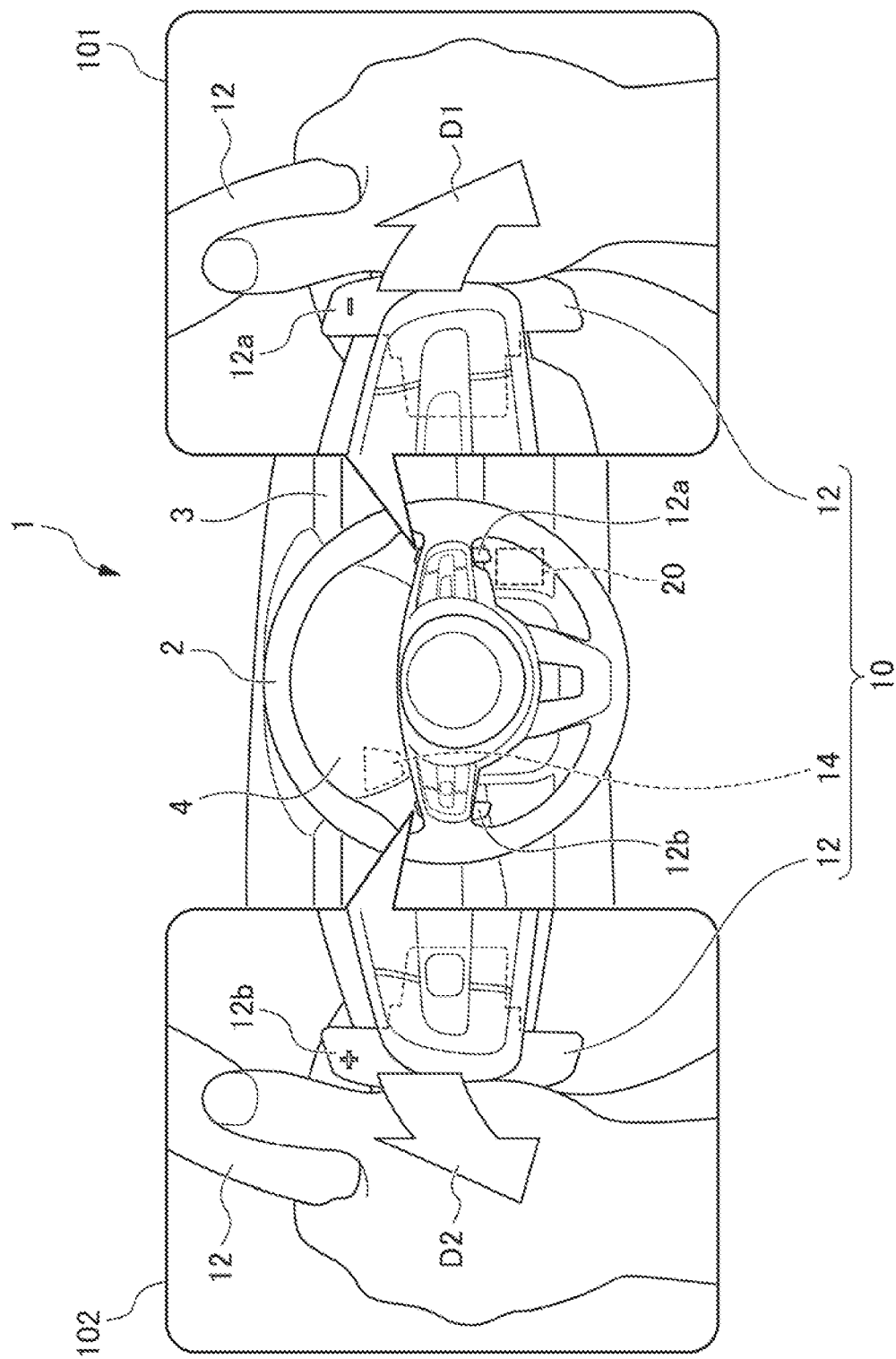
FIG. 1 is a diagram showing a steering wheel and a dashboard of a vehicle provided with a controller for vehicle of the present embodiment.

A configuration of a controller 1 for a vehicle will be described. FIG. 1 is a diagram showing a steering wheel 2 and a dashboard 3 of a vehicle provided with the controller 1 for the vehicle of the present embodiment. Hereinafter, the controller 1 for the vehicle may be simply referred to as the controller 1. In addition, the steering wheel 2 is also called a steering. The controller 1 of the present embodiment includes a paddle shifter 10 and a control unit 20.

<Paddle Shifter>

The paddle shifter 10 includes a pair of operation portions 12 and a notifier 14. The pair of operation portions 12 include a first operation portion 12a and a second operation portion 12b. The first operation portion 12a and the second operation portion 12b are provided near the steering wheel 2. The notifier 14 is provided on an instrument panel 4 of the dashboard 3, for example.

<Operation Portion>

Both of the first operation portion 12a and the second operation portion 12b of the operation portion 12 are provided on a back side of the steering wheel 2. The first operation portion 12a is arranged on a right back side of the steering wheel 2. On the other hand, the second operation portion 12b is arranged on a left back side of the steering wheel 2. The driver can operate the first operation portion 12a and the second operation portion 12b while gripping the steering wheel 2. Reference numeral 101 in FIG. 1 indicates an enlarged state of neighborhood of the first operation portion 12a. Further, reference numeral 102 in FIG. 1 indicates an enlarged state of neighborhood of the second operation portion 12b. As indicated by 101, the driver can operate the first operation portion 12a by pulling the first operation portion 12a toward himself/herself as indicated by an arrow D1 while gripping the steering wheel 2. Similarly, as indicated by 102, the driver can operate the second operation portion 12b by pulling the second operation portion 12b toward himself/herself as indicated by an arrow D2 while gripping the steering wheel 2.

<Deceleration and Shift Characteristic>

The paddle shifter 10 is a device that enables change of deceleration and change of a shift characteristic of the vehicle. The paddle shifter 10 changes deceleration and shift characteristic based on the operation of the operation portion 12 by the driver.

The change of deceleration means decreasing or increasing the degree of deceleration relative to the current deceleration. On the other hand, the change of shift characteristic means changing the shift characteristic between a fixed shift mode and an automatic shift mode. Here, the fixed shift mode is a mode in which the shift characteristic of the vehicle is determined based on the operation of the driver. On the other hand, the automatic shift mode is a mode in which the shift characteristic of the vehicle is automatically determined based on a running condition of the vehicle.

<Function of Operation Portion>

As described above, the deceleration and the shift characteristic is changed based on the operation of the operation portion 12. When the operation portion 12 is pulled toward the driver short, it is regarded as an operation for deceleration. On the other hand, when the operation portion 12 is pulled toward the driver long, it is regarded as an operation for the shift characteristic. In the following description, pulling long may be referred to as long pulling. Further, the state in which the operation portion 12 is pulled toward the driver may be referred to as an ON state.

<Allocation of Deceleration>

In the following description, the first operation portion 12a is assumed to be a DOWN paddle, whereas the second operation portion 12b is assumed to be an UP paddle. In this case, when the first operation portion 12a is pulled short, the strength of deceleration increases. On the other hand, when the second operation portion 12b is pulled short, the strength of deceleration decreases. In this way, the operation portion 12 functions as a paddle for a deceleration selector. In addition, the increasing in the strength of deceleration corresponds to an increase in the number of gear stages. On the other hand, the decreasing in the strength of deceleration corresponds to a decrease in the number of gear stages.

<Allocation of Shift Characteristic>

In the paddle shifter 10 of the present embodiment, the first operation portion 12a is allocated to a fixed paddle. On the other hand, the second operation portion 12b is allocated to a smart paddle. In this case, when the first operation portion 12a is pulled long, the shift characteristic is set to the fixed shift mode. On the other hand, when the second operation portion 12b is pulled long, the shift characteristic is set to the automatic shift mode.

<Notifier>

Next, the notifier 14 will be described. The paddle shifter 10 includes the notifier 14 in addition to the operation portion 12. When the shift characteristic is changed, the notifier 14 is a device that notifies the driver of the change. The notifier 14 can be provided on the instrument panel 4 of the dashboard 3, for example. When the shift characteristic becomes the automatic shift mode, the notifier 14 performs notification in a first form. In addition, when the shift characteristic becomes the fixed shift mode, the notifier 14 performs notification in a second form. Here, the first form and the second form are different from each other.

The form of notification is not particularly limited and may be, for example, sound, display, or vibration. It is sufficient that the first form and the second form are different, and a way for making the forms different is not particularly limited. Examples of the way for making the forms different include the volume of sound, the shape, color, and size of an image, the strength of vibration, and the frequency of notification.

<Control Unit>

Next, the control unit 20 will be described. The controller 1 for the vehicle of the present embodiment includes the control unit 20 in addition to the paddle shifter 10. The control unit 20 is a portion that controls changes in deceleration and changes in the shift characteristic of the vehicle according to the operation of the operation portion 12. The control unit 20 can be arranged inside the dashboard 3, for example.

<Behavior During Operation>

Hereinafter, behavior during the operation of the operation portion 12 will be described in order. As described above, examples will be described below in which the first operation portion 12a is set as the DOWN paddle and the fixed paddle and the second operation portion 12b is set as the UP paddle and the smart paddle.

<Activation of Subsequent Operation>

In the controller 1 of the present embodiment, when the first operation portion 12a is fixed in a state of being pulled long, the operation of the second operation portion 12b is activated. Further, when the second operation portion 12b is fixed in a state of being pulled long, the operation of the first operation portion 12a is activated.

Here, the state where the operation portion 12 is fixed in a state being pulled long includes a physical state and an electrical state. The physical state means a state where the operation portion 12 remains physically pulled toward the driver. The electrical state means a state where an electrical signal or the like indicating that the operation portion 12 is being pulled toward the driver continues to be transmitted to the control unit 20. In other words, the electrical state means a state where the operation portion 12 is not at a position of being physically pulled toward the driver, but the operation portion 12 is electrically recognized as being pulled toward the driver.

In the following description, the state where the operation portion 12 is pulled is referred to as an ON state. The ON state includes both cases in which the operation portion 12 is pulled short and long. Further, the operation portion 12 being fixed in a state of being pulled long may be referred to as ON fixation. The ON fixation includes physical fixation and electrical fixation as described above. In the following description, the ON fixation is mainly assumed to be electrical fixation.

In the controller 1 of the present embodiment, even when the previous operation is fixed in the ON state as described above, the subsequent operation is activated. For example, when one operation portion 12 of the pair of operation portions 12 remains in the ON state for a predetermined period of time, the change in the shift characteristic of the vehicle based on the other operation portion 12 is activated.

Thus, after one operation portion 12 is operated, the operation portion 12 can complete the change in the shift characteristic of the vehicle based on the other operation portion 12. In other words, the controller 1 switches activation or deactivation of the control, which is input from the operation portion 12, based on the duration of the ON state of one operation portion 12. Therefore, a component or a circuit does not need to be provided separately to determine malfunction. Thereby, costs of the controller 1 can be reduced.

The predetermined period of time is not particularly limited, and can be appropriately set according to the characteristic of the vehicle and the driver's feeling of driving that is desired to be realized, for example.

<Switching to Subsequent Operation>

In the controller 1 of the present embodiment, when the first operation portion 12a remains in the ON state for a predetermined period of time and then the second operation portion 12b enters an ON state, the shift characteristic of the vehicle is switched to the automatic shift mode. Similarly, when the second operation portion 12b remains in the ON state for a predetermined period of time and then the first operation portion 12a enters an ON state, the shift characteristic of the vehicle may be switched to the fixed shift mode.

Figure 2:
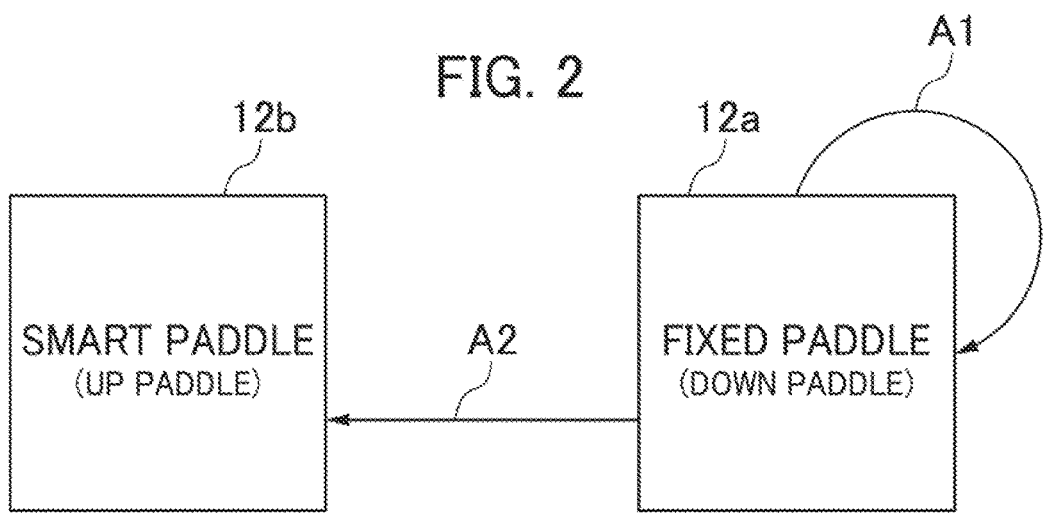
FIG. 2 is a diagram showing an example of control by the controller of the present embodiment.

An example thereof will be described with reference to FIG. 2. FIG. 2 is a diagram showing an example of control by the controller 1 of the present embodiment. In the controller 1, when it is detected that the second operation portion 12b being a smart paddle is pulled long (an arrow A2 in FIG. 2) while the first operation portion 12a remains continuously detected to be in the state of being pulled long for a predetermined period of time or longer (an arrow A1 in FIG. 2), the shift characteristic of the vehicle is switched to the automatic shift mode, which is the shift characteristic corresponding to the second operation portion 12b. The example has been described above in which the first operation portion 12a is operated in advance and then the second operation portion 12b is operated, but similar switching can also be performed when the second operation portion 12b is operated in advance and then the first operation portion 12a is operated.

As described above, when one operation portion 12 remains the ON state for a predetermined period of time and then the other operation portion 12 enters an ON state, the controller 1 can set the shift characteristic of the vehicle to a mode according to the operation of the other operation portion 12. Thus, even when the ON fixation occurs, the shift characteristic can be switched to the mode desired by the driver only by the operation of the operation portion 12 without providing additional components or circuits.

<Notifier>

In the controller 1 of the present embodiment, the notifier 14 performs notification in the first form when the shift characteristic of the vehicle becomes the automatic shift mode. Similarly, the notifier 14 performs notification in the second form different from the first form when the shift characteristic of the vehicle becomes the fixed shift mode.

Figure 3:
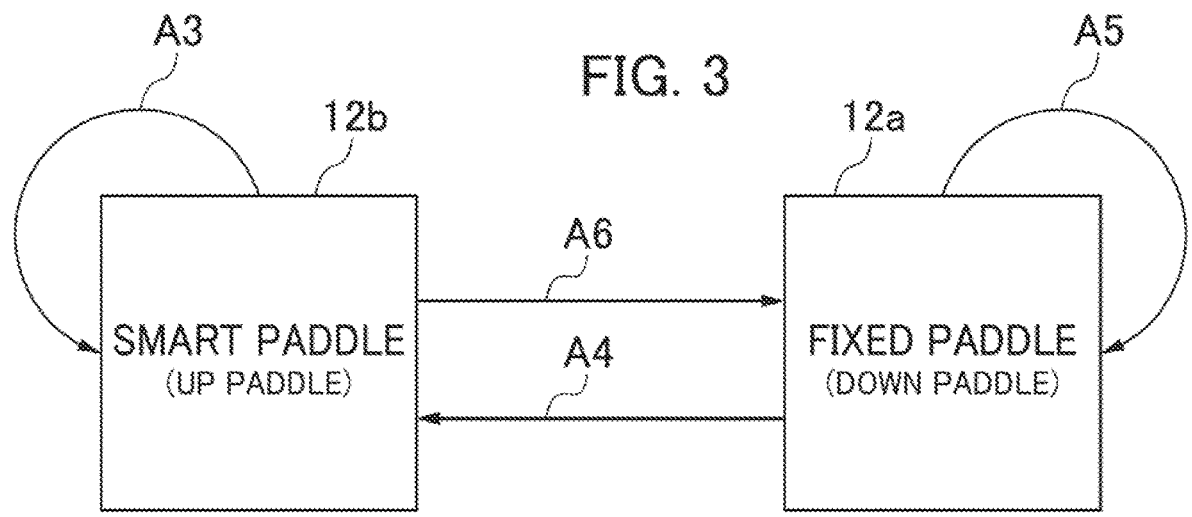
FIG. 3 is a diagram showing another example of control by the controller of the present embodiment.

Notification by the notifier 14 and switching of the shift characteristic will be described with reference to FIG. 3. FIG. 3 is a diagram showing an example of notification by the controller 1 of the present embodiment. In the controller 1, when it is detected that the second operation portion 12b is pulled long (an arrow A3 in FIG. 3), the control unit 20 switches the shift characteristic from the fixed shift mode to the automatic shift mode (an arrow A4 in FIG. 3). At the same time, the notifier 14 notifies switching to the automatic shift mode in the first form. In the controller 1, similarly, when it is detected that the first operation portion 12a is pulled long (an arrow A5 in FIG. 3), the control unit 20 switches the shift characteristic from the automatic shift mode to the fixed shift mode (an arrow A6 in FIG. 3). At the same time, the notifier 14 notifies switching to the fixed shift mode in the second form.

Based on the notification of the notifier 14, the driver of the vehicle can recognize the switching of the shift characteristic to the automatic shift mode or the fixed shift mode. In the controller 1 of the present embodiment, therefore, it is possible for the driver to recognize more reliably, from the notification of the notifier 14, that the ON fixation occurs in the operation portion 12. As a result, the driver can more quickly be caused to perform switching to the desired shift characteristic.

Figure 4:
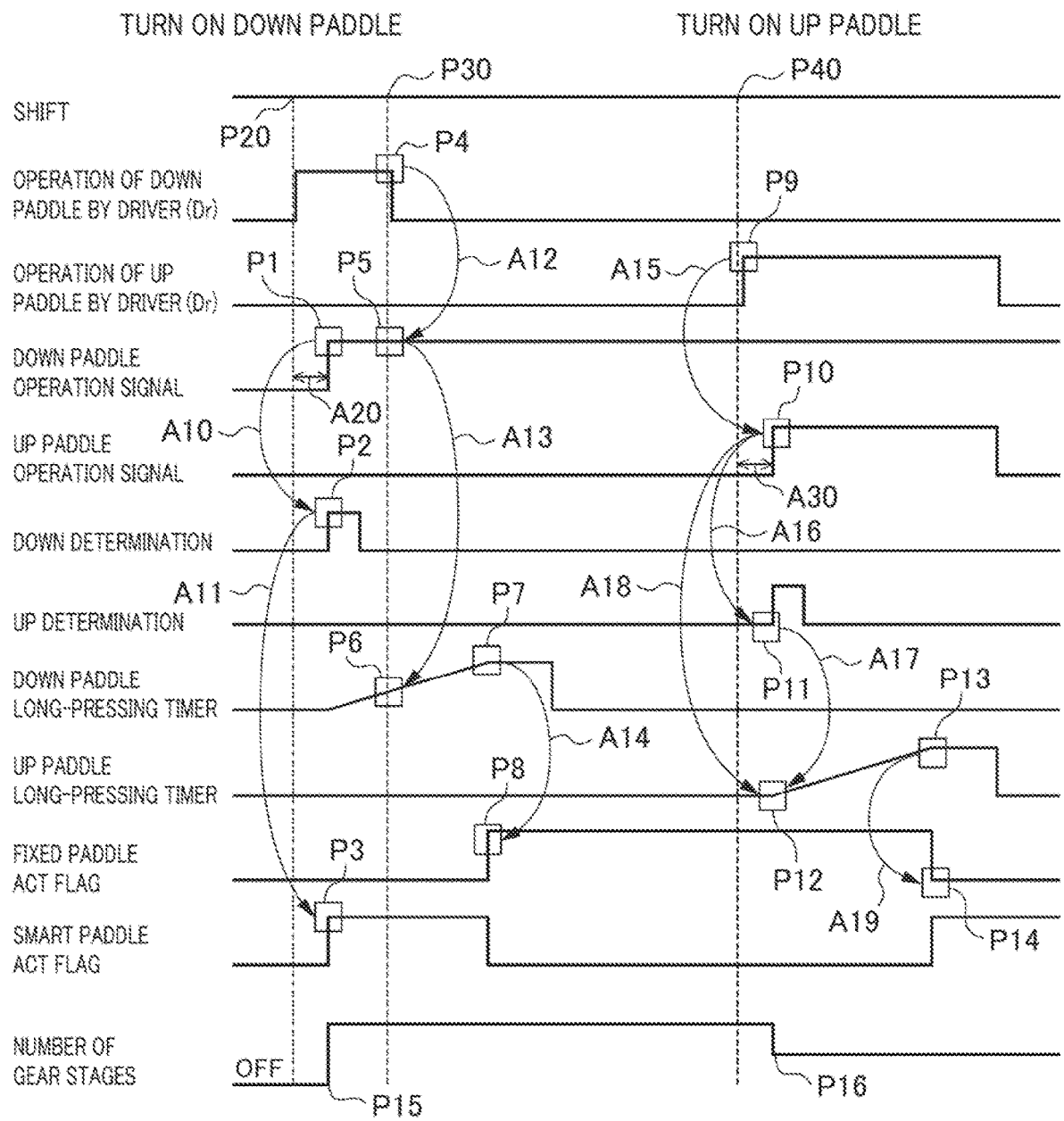
FIG. 4 is a timing chart showing a relationship between an operation of an operation portion and control by a control unit.

An example of control of the controller 1 of the present embodiment will be described with reference to FIG. 4. FIG. 4 is a timing chart showing a relationship between the operation of the operation portion 12 and the control by the control unit 20. In FIG. 4, the first operation portion 12a is indicated as a "DOWN paddle" and the second operation portion 12b is indicated as an "UP paddle" so as to make the description more realistic. In addition, "Dr" in FIG. 4 means a "driver". Furthermore, an "act flag" means notification by the notifier 14.

<ON of DOWN Paddle>

First, at time point P20, the driver turns ON the DOWN paddle. After the DOWN paddle is turned ON, at time point P1 after a paddle operation decision time of an arrow A20 has elapsed, a DOWN paddle operation signal is turned ON. The paddle operation decision time is a waiting time provided to prevent chattering. As the DOWN paddle operation signal is turned ON (an arrow A10), DOWN determination becomes ON determination at time point P2. In addition, since the driver's operation of the DOWN paddle is selection of a shift other than a B range, a smart paddle starts to operate at time point P3. In addition, a smart paddle act flag is turned ON as the smart paddle starts to operate. The B range will be described below. The number of gear stages becomes 3 at time point P15 based on the DOWN determination described above.

<ON Fixation of DOWN Paddle>

At time point P30, ON fixation of the DOWN paddle occurs. At time point P4, the driver releases the DOWN paddle from ON. However, the DOWN paddle operation signal continues to be ON after time point P5 (an arrow A12). A DOWN paddle long-pressing timer continues to detect that the DOWN paddle operation signal is turned ON even after time point P6 (an arrow A13), and it is decided at time point P7 that an ON operation of the DOWN paddle is pulled long. Then, at time point P8, a fixed paddle not intended by the driver is decided. As the fixed paddle is decided, the fixed paddle starts to operate and a fixed paddle act flag is turned ON.

<ON of UP Paddle>

At time point P40, the driver turns ON the UP paddle. As indicated by an arrow A15, at time point P11 after a paddle operation decision time of an arrow A30 has elapsed from time point P9 which is the same as time point P40, an UP paddle operation signal is turned ON (an arrow A15). As indicated by an arrow A18, an UP paddle long-pressing timer starts measurement from time point P12 which is the same as time point P10, and it is decided at time point P13 that an ON operation of the UP paddle is pulled long. By this decision, as indicated by an arrow A19, the fixed paddle is switched to the smart paddle at time point P14. Accordingly, the fixed paddle act flag is turned OFF, while the smart paddle act flag is turned ON.

Further, by the UP paddle operation signal at time point P10, UP determination becomes ON determination at time point P11 as indicated by an arrow A16. Accordingly, the number of gear stages changes from three to two at time point P16.

The above-described ON of the UP determination at time point P11 and the start of measurement of the UP paddle long-pressing timer at time point P12 indicate an example in which the subsequent operation is accepted even when the previous operation is fixed in a certain state due to malfunction.

In the controller 1 of the present embodiment as described above, when input to both of the UP paddle and the DOWN paddle are detected, the input to the paddle whose detection start timing is later is determined to be valid. Therefore, for example, even when malfunction occurs in which the DOWN paddle is fixed in an ON state, the UP paddle can be operated to reduce a deceleration force, and the fixed paddle can be released to start to operate the smart paddle. When detection timings of both of the UP paddle and the DOWN paddle match completely, it can be determined that such an operation is invalid.

<Aspects of Deceleration>

Aspects of deceleration will be described. The aspects of deceleration indicate how the vehicle decelerates when the accelerator is released. Some vehicles are capable of selecting an aspect of deceleration. Examples of aspects of deceleration to be selected include a D range, a B range, and a deceleration selector. The D range is accelerator-off deceleration accustomed to use, which is an aspect of natural deceleration feel. The B range is an aspect in which when the accelerator is released, the vehicle is decelerated steadily and the braking operation is reduced. In the B range, it is possible to steadily decelerate a speed even with single pedal operation. The deceleration selector is an aspect in which the deceleration can be adjusted in a plurality of stages, such as four stages, according to preference. In the deceleration selector, safety and smooth driving can be achieved by an operation of the accelerator.

For example, in a case of a vehicle that allows selection of the B range, a method of selecting the fixed paddle may include the selection of the B range in addition to the long pulling of the DOWN paddle. Further, a method of releasing the fixed paddle and selecting the smart paddle may include selection of a shift other than the B range in addition to the long pulling of the UP paddle. The reason why the smart paddle starts to operate in advance by an arrow A11 in FIG. 4 is that the DOWN paddle is operated as the selection of the shift other than the B range.

Thus, for example, when malfunction occurs in which the DOWN paddle is fixed in an ON state, the UP paddle can be operated to reduce the deceleration force, and the fixed paddle can be released to start to operate the smart paddle.

On the other hand, when the vehicle is not equipped with the B range or when the B range is installed but cannot be selected due to malfunction, the fixed paddle can be selected by long pulling of the DOWN paddle and the smart paddle can be selected by long pulling of the UP paddle. Thereby, it is possible to switch the shift characteristic without adding a new switch or interface. In addition, the driver can switch the shift characteristic without taking his/her hands off the steering wheel 2.

As described above, the controller 1 for the vehicle of the present embodiment enables the operation based on the other paddle to be activated when the paddle assigned with the fixed shift mode setting function is fixed in an ON state, for example. In other words, when the operation of both of the paddles is detected, the paddle input detected later is employed. Specifically, for example, when one operation portion remains in the ON state for a predetermined period of time, the control based on the other operation portion is activated. Thus, the change in the shift characteristic of the vehicle based on the other operation portion can be completed with the paddle shift.

EXPLANATION OF REFERENCE NUMERALS 1 controller for vehicle
2 steering wheel
3 dashboard
4 instrument panel
10 paddle shifter
12 operation portion
12a first operation portion (one operation portion)
12b second operation portion (the other operation portion)
14 notifier
20 control unit

What is claimed is:
1. A controller for vehicle, comprising:
a paddle shifter provided in a steering apparatus of the vehicle, the paddle shifter being capable of changing deceleration of the vehicle and a shift characteristic of the vehicle,
the paddle shifter including a pair of operation portions that decrease or increase the deceleration relative to current deceleration in response to an operation of a driver, wherein the shift characteristic of the vehicle is set to a fixed shift mode based on the operation of the driver in response to an operation of one of the operation portions, the shift characteristic of the vehicle is set to an automatic shift mode based on a running condition of the vehicle in response to an operation of another of the operation portions, and when the one operation portion of the pair of operation portions remains in an ON state for a predetermined period of time, a change in the shift characteristic of the vehicle based on the other operation portion is activated.

2. The controller for vehicle according to claim 1, wherein when the one operation portion remains in the ON state for the predetermined period of time and then the other operation portion enters an ON state, the paddle shifter switches the shift characteristic of the vehicle to the automatic shift mode.

3. The controller for vehicle according to claim 1, further comprising a notifier that notifies the driver, wherein the notifier performs notification in a first form when the shift characteristic of the vehicle becomes the automatic shift mode based on the running condition of the vehicle, and the notifier performs notification in a second form different from the first form when the shift characteristic of the vehicle becomes the fixed shift mode based on the operation of the driver.

4. The controller for vehicle according to claim 2, further comprising a notifier that notifies the driver, wherein the notifier performs notification in a first form when the shift characteristic of the vehicle becomes the automatic shift mode based on the running condition of the vehicle, and the notifier performs notification in a second form different from the first form when the shift characteristic of the vehicle becomes the fixed shift mode based on the operation of the driver.

* * * * *